C. CARPENTER.
VEHICLE WHEEL.
APPLICATION FILED MAY 25, 1916.
1,199,346.
Patented Sept. 26, 1916.
Fig. 1
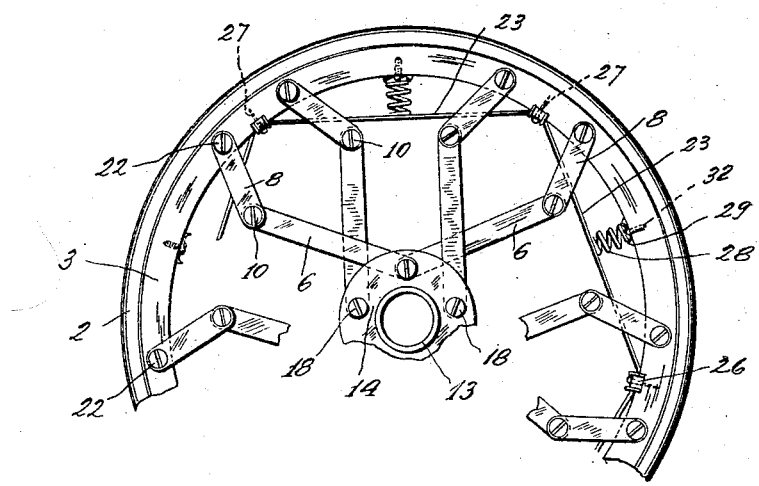
Fig. 2     Fig. 3     Fig. 4
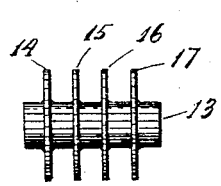 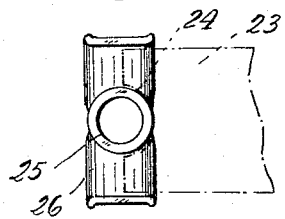 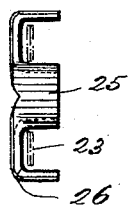
Fig. 5     Fig. 6
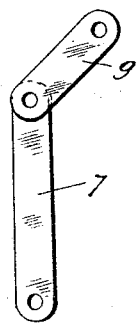 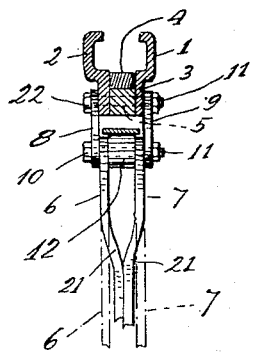
Fig. 7
Fig. 8
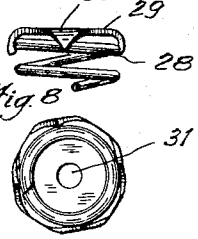
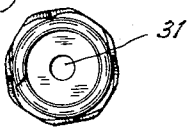
INVENTOR
Chalmer Carpenter
By Max H. Srolovitz
atty.

ated Sept. 26, 1916.
UNITED STATES PATENT OFFICE.

CHALMER CARPENTER, OF PITTSBURGH, PENNSYLVANIA.

VEHICLE-WHEEL.

1,199,346.  Specification of Letters Patent.  Patented Sept. 26, 1916.

Application filed May 25, 1916. Serial No. 99,731.

*To all whom it may concern:*

Be it known that I, CHALMER CARPENTER, a citizen of the United States, residing at Pittsburgh, county of Allegheny, and State of Pennsylvania, have invented certain new and useful Improvements in Vehicle-Wheels, of which the following is a specification.

This invention relates to vehicle wheels, more particularly to that class termed spring wheels, and has for its object to provide, in a manner as hereinafter set forth, a spring wheel which obtains the cushioning effects of the ordinary pneumatic tired wheels now in general use without the employment of pneumatic cushioning elements under such conditions overcoming the inconveniences created by blow-outs and punctures.

Further objects of the invention are to provide a spring wheel which is strong, durable, efficient in its use, readily assembled and disassembled, comparatively inexpensive to manufacture, possessing the cushioning characteristics of a pneumatic tired wheel, and permitting of the quick removal of a damaged or injured element and the substituting of a new one therefor.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a fragmental side elevation of a spring wheel constructed in accordance with this invention. Fig. 2 is a detail illustrating the hub of the wheel. Figs. 3 and 4 are respectively a plan and a section of the coupling member for the spoke tensioning member. Fig. 5 is a detail of a spoke. Fig. 6 is a sectional elevation of a spoke, the rim and a spoke tensioning member. Figs. 7 and 8 are respectively a side view and a plan of the resilient reinforcing element for a spoke tensioning member.

Referring to the drawings the wheel embodies a rim, a hub, a series of sectional pivotally connected spokes, a series of tensioning members for the spokes and a series of resilient reinforcing elements for the tensioning members.

The rim consists of a pair of oppositely disposed annular members 1, 2, which are channel-shaped in vertical section and each of which has an inwardly extending annular flange 3. Arranged between the inner side of the members 1, 2, and the flanges 3 is a concentric band 4 and positioned against the latter and between the flanges 3 is an annular member or felly 5 preferably formed of wood. The members 1, 2, and the band 4 are preferably constructed of metal. When the rim is set up the members 1, 2, are offset with respect to the flanges 3.

Each of the spokes consists of a pair of links 6, 7, which form the inner section of the spoke and the outer section is formed from a pair of links 8, 9, which are shorter than the links 6, 7. The outer ends of the links 6, 7, are arranged between the inner ends of the links 8, 9, and the said outer ends of the links 6, 7, are pivotally connected to the inner ends of the links 8, 9, by a bolt 10, which extends through the said ends and carries a nut 11. Mounted upon the bolt 10 between the outer ends of the links 6, 7, is a roller 12.

The hub 13 has formed integral with the periphery thereof a series of laterally extending spaced wide flanges 14, 15, 16, 17 and extending through said flanges at equidistant points are headed bolts 18, one bolt for each pair of spokes.

The inner sections of the spokes are tangentially disposed with respect to the flanges 14, 15, 16 and 17 and the inner sections of a pair of spokes have their inner ends pivotally mounted on a bolt 18. The inner sections of the spokes are so arranged that the inner section of one spoke, links 6, 7, extend between the inner section, links 6, 7, of an adjacent section. Those links 6, 7, of inner spoke sections which extend between links 6, 7, of adjacent spoke sections have their inner portions inset, as at 21, see Fig. 6, so that the arrangement referred to can be obtained. The pairs of inset links are alternately arranged with respect to the other pairs of links of the said inner spoke sections.

The flanges 14 are arranged against the outer face of the links 6 which are not inset, the flange 15 between the links 6 just referred to and the inset links 6, the flange 16 between the inset links 7 and the links 7 which are not inset and the flange 17 against the outer face of the links 7 which are not inset. This arrangement prevents the inner spoke sections from rubbing against each other when shifting.

When the inner spoke sections are set up, the inner end of a pair of inset links 6, 7, and the inner end of a pair of links 18 are mounted on a common pivot i. e. a bolt 22.

The outer spoke sections are disposed at an inclination with respect to the inner spoke sections and the links 8, 9, of the outer spoke sections have their outer ends pivotally mounted on headed bolts 22, which extend through the flanges 3 and member 5. The links 8, 9, of each outer spoke section are arranged against the outer faces of the flanges 3. The bolts 22 not only provide pivots for the outer ends of the outer spoke sections, but also provide means for coupling the members 1, 2, of the rim together.

The inclination of the outer spoke section is such that one outer section will extend in an opposite direction with respect to an adjacent outer spoke section and by this arrangement every alternate outer spoke section will extend toward an adjacent outer section.

Associated with the spokes are tensioning members therefor and each of these members consists of an elongated flat spring 23 having a notch 24 at each end. Each tensioning member associates with a pair of spokes and extends through the outer sections of the pair of spokes with which it associates. The spring 23 bears on the rollers 12 on the bolts 10 which pivotally connect the outer spoke sections to the inner spoke sections.

Secured to the inner face of the rim and bearing against the band 4 and over-lapping the flanges 3 are coupling members 26 for securing the spoke tensioning members in position. Each of the coupling members consists of a collar 25 against which are positioned the opposed notched ends of a pair of springs 23, the notches 24 permitting of the opposed ends of the springs 23 to surround the collar 25. Projecting from the collar 25 is a pair of oppositely disposed L-shaped arms 26 which form a seat for the notched ends of the springs 23, and further so that the coupling members will overlap the flanges 3. Securing devices 27, which extend through the rim and engage in the coupling members are employed for connecting said members to the rim whereby the tensioning members are maintained in position.

For the purpose of reinforcing the tensioning members, and further for maintaining the said members on the rollers 12, reinforcing elements are positioned between the tensioning members and the rim. The reinforcing elements consist of coiled-springs 28 seated on the springs 23 and carrying retaining caps 29 provided with inwardly extending V-shaped lugs 30, which confine the outer ends of the springs 28 within the caps, the caps having openings 31 for the passage of securing means 32 to connect the caps to the rim for the purpose of maintaining the reinforcing elements in position.

The tensioning members for the spokes combined with the resilient reinforcing elements set up a cushioning function when the sections of the spokes swing on their pivots and under such conditions shock and jar are reduced to a minimum when the wheel is traveling over an uneven road surface or when the wheel meets with an obstruction. In fact the arrangement of springs 23 and 28 sets up what may be termed a shock absorber.

What I claim is:—

1. A vehicle wheel comprising a hub, inner spoke sections pivotally connected therewith and disposed tangentially with respect thereto, outer spoke sections pivotally connected with the outer ends of the inner spoke sections, a rim, means for pivotally connecting the outer ends of the outer spoke section to said rim, a series of tensioning members, each of said members bearing against a pair of pivots between a pair of inner and a pair of outer spoke sections, and means for connecting the ends of the tensioning members to said rim.

2. A vehicle wheel comprising a hub, inner spoke sections pivotally connected therewith and disposed tangentially with respect thereto, outer spoke sections pivotally connected with the outer ends of the inner spoke sections, a rim, means for pivotally connecting the outer ends of the outer spoke section to said rim, a series of tensioning members, each of said members bearing against a pair of pivots between a pair of inner and a pair of outer spoke sections, and means for connecting the ends of the tensioning members to said rim, and resilient reinforcing elements interposed between said tensioning members and the rim.

3. A vehicle wheel comprising a hub, inner spoke sections pivotally connected therewith and disposed tangentially with respect thereto, outer spoke sections pivotally connected with the outer ends of the inner spoke sections, a rim, means for pivotally connecting the outer ends of the outer spoke sections to said rim, a series of tensioning members, each of said members bearing against a pair of pivots between a pair of inner and a pair of outer spoke sections, and means for connecting the ends of the tensioning members to said rim, and resilient reinforcing elements interposed between said tensioning members and the rim, and means for connecting said elements to the rim.

4. A vehicle wheel comprising a hub, inner spoke sections pivotally connected therewith, outer spoke sections, means for pivotally connecting the outer ends of the inner spoke sections to the inner ends of the outer spoke sections, a rim, means for pivotally connecting the outer ends of the outer spoke sections to the rim, a series of tensioning members, each of said members extending through a pair of outer spoke sections, rollers carried by the means for pivotally connecting the outer to the inner spoke sections and upon which bear said members, and means for connecting the tensioning members to the rim.

5. A vehicle wheel comprising a hub, inner spoke sections pivotally connected therewith, outer spoke sections, means for pivotally connecting the outer ends of the inner spoke sections to the inner ends of the outer spoke sections, a rim, means for pivotally connecting the outer ends of the outer spoke sections to the rim, a series of tensioning members, each of said members extending through a pair of outer spoke sections, rollers carried by the means for pivotally connecting the outer to the inner spoke sections and upon which bear said members, and means for connecting the tensioning members to the rim, and resilient reinforcing members interposed between the tensioning members and the rim.

6. A vehicle wheel comprising a hub, inner spoke sections pivotally connected therewith, outer spoke sections, means for pivotally connecting the outer ends of the inner spoke sections to the inner ends of the outer spoke sections, a rim, means for pivotally connecting the outer ends of the outer spoke sections to the rim, a series of tensioning members, each of said members extending through a pair of outer spoke sections, rollers carried by the means for pivotally connecting the outer to the inner spoke sections and upon which bear said members, and means for connecting the tensioning members to the rim, and resilient reinforcing members interposed between the tensioning members and the rim, and means for connecting the reinforcing elements to the rim.

7. A vehicle wheel comprising a hub, inner spoke sections pivotally connected therewith and arranged tangentially with respect thereto, a rim, outer spoke sections disposed at an inclination with respect to said inner spoke sections, means for pivotally connecting the outer to the inner spoke sections, means for pivotally connecting the outer spoke sections to the rim, spoke tensioning members extending through said outer spoke sections, and bearing against the pivots between said outer and inner sections, and means for connecting the tensioning members to the rim, and resilient reinforcing elements arranged between the tensioning members and the rim.

In testimony whereof I affix my signature in the presence of two witnesses.

CHALMER CARPENTER.

Witnesses:
  B. E. JENKINS,
  LUELLA H. SIMON.

Copies of this patent may be obtained for five cents each, by addressing the "Commissioner of Patents, Washington, D. C."